(12) United States Patent
Fenney

(10) Patent No.: US 7,428,628 B2
(45) Date of Patent: Sep. 23, 2008

(54) METHOD AND APPARATUS FOR MANAGEMENT OF CONTROL FLOW IN A SIMD DEVICE

(75) Inventor: Simon Fenney, St Albans (GB)

(73) Assignee: Imagination Technologies Limited, Hertfordshire (GB)

( * ) Notice: Subject to any disclaimer, the term of this patent is extended or adjusted under 35 U.S.C. 154(b) by 376 days.

(21) Appl. No.: 10/996,269

(22) Filed: Nov. 23, 2004

(65) Prior Publication Data

US 2005/0198467 A1 Sep. 8, 2005

(30) Foreign Application Priority Data

Mar. 2, 2004 (GB) ................................. 0404683.5

(51) Int. Cl.
*G06F 15/80* (2006.01)

(52) U.S. Cl. .......................................... 712/13; 712/5

(58) Field of Classification Search .................. 712/13, 712/225, 4, 5
See application file for complete search history.

(56) References Cited

U.S. PATENT DOCUMENTS 5,604,913 A 2/1997 Koyanagi et al.
6,167,501 A * 12/2000 Barry et al. .................... 712/11

FOREIGN PATENT DOCUMENTS

| GB | 2348981 A | 10/2000 |
| JP | 11-296498 A | 10/1999 |
| WO | WO 02/46885 A2 | 6/2002 |

OTHER PUBLICATIONS

United Kingdom Patent Office Search Report dated Jun. 18, 2004 (4 pages).
Levinthal, Adam and Porter, Thomas, Chap—A SIMD Graphics Processor, Jul. 1984, Computer Graphics, vol. 18, No. 3, pp. 77-82.

* cited by examiner

*Primary Examiner*—Eric Coleman
(74) *Attorney, Agent, or Firm*—Flynn, Thiel, Boutell & Tanis, P.C.

(57) ABSTRACT

A single instruction multiple data processing device includes a plurality of processing elements. Each processing element includes an execute mask count register storing a plurality of bits. The writing updated data to registers in each processing element is enabled and disabled in dependence on the multi bit data stored in the execute mask count register.

23 Claims, 6 Drawing Sheets

METHOD AND APPARATUS FOR MANAGEMENT OF CONTROL FLOW IN A SIMD DEVICE

FIELD OF THE INVENTION

This invention relates to a method and apparatus for management of control flow in a single instruction multiple data (SIMD) processing device.

Computing devices are commonly classified into four broad categories
1. Single Instruction/Single Data (SISD),
2. Multiple Instruction/Single Data (MISD) (an unusual category)
3. Single Instruction/Multiple Data (SIMD), and
4. Multiple Instruction/Multiple Data (MIMD).

The first category, SISD, describes the majority of existing computer devices wherein a single instruction stream operates on a single set of data. The fourth, MIMD, describes systems like processor farms and some super-computers, in which N processors (i.e. instructions) can be independently executing on N sets of data.

The third category, SIMD, is a blend of the two extremes. A SIMD device generally has a single Control Unit (CU) that interprets an instruction stream and an array of multiple homogeneous parallel Processing Elements (PEs) which operate in lock step under the guidance of the CU. Each PE typically contains an Arithmetic/Logic Unit (ALU), registers, and/or interfaces to memories and/or neighbouring PEs.

Many modern CPUs, e.g. x86, and PowerPC, contain instructions that control a SIMD subunit. SIMD systems are used in many applications including computer graphics and multimedia are becoming more common.

In each cycle, the CU instructs all PEs to perform the same operation. In effect, each PE is running the same program and, moreover, the same line of code as the other PEs except with different data. This leads to some interesting control flow issues. For example, consider the following pseudo code with a simple IF-THEN-ELSE construct:

```
CodeBlock_1;
IF (condition_1) THEN
    CodeBlock_2;
ELSE
    CodeBlock_3;
ENDIF
CodeBlock_4;
```

Since each PE is executing the same instruction, we have a dilemma when we reach the 'IF' statement. For example, let's assume that 'condition_1' is a test of the value of a local PE data register value. For $PE_j$ 'condition_1' may evaluate to 'true' requiring execution of 'CodeBlock_2' but not 'CodeBlock_3', whereas on $PE_k$ the converse may apply.

A prior art solution is to include a feature know as 'masking'. Each PE includes a Boolean 'Enable Register', ER, '13', such that, if the enable register is 'false', writings to data registers within the PE are disabled. The simple example given above is thus re-encoded as:

```
CodeBlock_1;
ER := condition_1;
    CodeBlock_2;
ER := NOT ER;
    CodeBlock_3;
ER := TRUE;
CodeBlock_4;
```

In the case of $PE_j$, 'CodeBlock_3' is processed but is completely harmless because it is not allowed to update any storage register as the associated ER has been set to 'false' in that part of the code. Note, however, that this was a particularly simple example and it will become clear that more complicated and/or nested control-flow code requires more careful coding.

There are several forms of other structured, control-flow constructs commonly found in modern programming languages, such as 'C'. A very brief summary of some of these constructs now follows:

Nesting:
Control flow constructs can be nested, i.e., one may be embedded within another. A simple example, using nested 'IF' constructs, is . . .

```
IF (condition_1) THEN
    CodeBlock_1;
    IF (condition_2) THEN
        CodeBlock_2;
    ENDIF
ELSE
    CodeBlock_3;
ENDIF
```

'CodeBlock_2' will only run if both 'condition_1' and then 'condition_2' pass. Note that 'CodeBlock_3' will not 'execute' if we have reached either 'CodeBlock_1' or 'CodeBlock_2'.

Multi-way IF-THEN-ELSIF-ELSE:
Although IF-THEN-ELSE can be nested to produce complex decisions, sometimes it is preferable to express them as chains of the following form:

```
IF (condition_1) THEN
    CodeBlock_1;
ELSIF (condition_2) THEN
    CodeBlock_2;
ELSIF (condition_3) THEN
    CodeBlock_3;
ELSE
    CodeBlock_4;
ENDIF
```

Note that this is more convenient to express than the functionally equivalent . . .

```
IF (condition_1) THEN
    CodeBlock_1;
ELSE
    IF (condition_2) THEN
        CodeBlock_2;
    ELSE
        IF (condition_3) THEN
            CodeBlock_3;
        ELSE
            CodeBlock_4;
```

-continued

```
        ENDIF
      ENDIF
    ENDIF
```

Loops:

A pre-tested loop, e.g. while-loop, takes the form . . .

```
CodeBlock_1;
WHILE (condition_1) DO
    CodeBlock_2;
ENDWHILE
CodeBlock_3;
```

In this example, if after executing 'CodeBlock_1', 'condition_1' is 'true', 'CodeBlock_2' will be executed. The condition will then be retested and if still 'true', 'CodeBlock_2' will be re-executed. This process repeats until the condition fails, after which 'CodeBlock_3' is run. A simple variation, the post-tested loop, does not perform the first conditional test so that 'CodeBlock_2' is always executed at least once.

Loops with 'breakloop' and 'continueloop':

Loops may be augmented by the use of 'breakloop' and/or 'continueloop' statements. If a 'breakloop' is encountered within a loop, it is as if the loop is instantly terminated at that point—all subsequent instructions inside the (innermost) loop are skipped and control proceeds to the instruction following the loop. A coding example is given below:

```
WHILE (condition_1) DO
    CodeBlock_1;
    IF(condition_2) THEN
        CodeBlock_2;
        BREAKLOOP;
    ENDIF
    CodeBlock_3;
ENDWHILE
CodeBlock_4;
```

After executing 'CodeBlock_1', if 'condition_2' is 'false', 'CodeBlock_3' will be executed and the loop condition will be retested. If, on the other hand, 'condition_2' is true, 'CodeBlock_2' will be run, the 'breakloop' command encountered, and control then passes immediately to 'CodeBlock_4'.

The 'continueloop' statement skips the remaining instructions inside the loop body but does not terminate the loop. Instead, it continues to the next iteration. If we replace 'breakloop' with 'continueloop' in the above example, then after encountering 'continueloop', control would proceed to the start of loop, retesting 'condition_1' etc.

Note that the breakloop and continueloop statements could be extended so that they refer not to the most deeply nested loop but to some outer parent loop.

Return and Exit commands:

Related to the 'breakloop' construct, some languages employ a 'return' statement to indicate that a procedure is to terminate early and return to the parent function. An 'exit' command is even more drastic in that it terminates the current process—this is occasionally used in error handling.

Case construct:

A case statement is a variation on IF-THEN-ELSE that is used to execute different sections of code depending on the value of a single expression. A typical example is . . .

```
CASE (Expression_1)
    WHEN Constant_A:
    WHEN Constant_B:
        CodeBlock_1;
        DONE;
    WHEN Constant_C:
        CodeBlock_2;
        /*note no DONE*/
    WHEN Constant_D:
        CodeBlock_3;
        DONE;
    DEFAULT:
        CodeBlock_4;
        DONE; /*redundant*/
ENDCASE;
```

In the above example, if 'Expression$_{13}$ 1' evaluates to either 'Constant_A' or 'Constant_B', then 'CodeBlock_1' will be executed. 'DONE', following 'CodeBlock_1', indicates that the case statement should now terminate. If, on the other hand, the expression evaluates to 'Constant_C', 'CodeBlock_2' is executed. Because there is no 'DONE' at the end of this section, execution continues with 'CodeBlock_3'. The 'DEFAULT' case is chosen if the expression does not match any of the listed values.

Recursion:

This final construct describes when a section of code references itself. This is a common feature of modern computer languages and can be found described in most textbooks. To support such a feature generally requires a program stack to save the program counter and other associated state.

In the prior art, one way of handling complex conditional code is to explicitly write instructions for the CU that directs each PE to compute the appropriate ER value. Intermediate values are then stored, say, in local program registers in each PE. This is certainly extremely flexible but requires many additional instructions that are likely to decrease performance.

In "A SIMD Graphics Processor", (Computer Graphics (Proceedings of SIGGRAPH 84), 18(3) pp 77-82, July 1984), Levinthal and Porter enhance the ER control flag by adding a 'run flag stack', consisting of a 'stack' of bit registers. The addition of instructions to push and pop values between the stack and the ER allows very easy implementation of some forms of nested conditional code. The CHAP control unit is also enhanced so that it includes a means of testing if all ER values are 'false'. This, for example, allows the efficient implementation of a 'while' loop across all the PEs. In particular, whenever an individual PE 'fails the loop test', it merely sets its ER to 'false' since loop iterations must continue if other PEs are not disabled. A special conditional branch instruction, which uses the test for when ERs are false, allows the CU to jump to the instruction after the end of the loop once all PEs have completed the loop.

Although the 'run flag stack' enhancement is a powerful construct that other systems have also later used—it is not without some shortcomings. Firstly, some of the above forms of control, such as 'continueloop', are not easily supported because only the ER bit is directly accessible. Secondly, if the depth of the stack is N, (i.e. N bits of storage per PE), the maximum nesting depth of control is limited to only ~N levels.

A variation on Levinthal and Porter's method is presented by WO 0246885 (Redford). In this system, the stack is replaced by a counter value. When an ER value is 'saved', the stored counter value is incremented whenever the ER is 'false'. Otherwise, the stored counter is not modified. When 'restoring', if the counter value is (for the sake of argument) non-zero, the counter is decremented and ER is set to 'false'. Otherwise, the counter is left unmodified and ER is set to 'true'. This improves the method of Levinthal et al in that the guaranteed safe maximum level of conditional nesting is $\sim 2^N$ for an N bit counter, albeit at the cost of additional increment and decrement units. Since it is only, in effect, a form of data compression of the stack, it still has the exactly the same issues with some common control operations.

The execution process is complex and requires special hardware which can search through the priority codes of all inactive PEs to find those with the least priority. When the system reaches the end of a block, it uses the above hardware to identify and run the block of code with the least priority value (disabling all other PEs in the process).

This system can handle some rather arbitrary conditional code, including arrangements sometimes termed 'spaghetti code'. However, due to the static pre-analysis of the source code, this method can handle recursion. Furthermore, while the search hardware for locating the least priority value may be tolerable for a very small numbers of PEs, it is likely to become very expensive and/or have a large timing latency with even moderate numbers of PEs.

Preferred embodiments of the invention are relatively inexpensive to implement, even with large numbers of PEs, yet allow for easy support of virtually all the common forms of control flow constructs used in 'structured programming'. It avoids the control limitations and/or costs with the prior art as described above, and it does not need significant pre-processing of the source code, thus simplifying the compilation process.

We have appreciated that, by extending the single bit ER flag to multiple bits, being able to test for a small number of pre-determined values of those bits, and by including a small set of control-flow instructions, a means of efficiently managing control flow on a SIMD processor can be achieved. Note that this differs from the prior art which uses a single bit ER flag to control instruction execution and where management of this flag is done with auxiliary structures, either explicit local registers, stack, counter, or a priority value.

In accordance with an embodiment of the invention there is provided a single instruction multiple data processing device (SIMD) comprising a plurality of processing elements (PE), each PE including an execute mask count (EMC) register for storing a plurality of bits, means for enabling and disabling writing of data to registers in the PE in dependence on multi-bit data stored in the EMC register.

In accordance with an embodiment of the invention there is provided a method for controlling program flow on a SIMD comprising a plurality of PEs, comprising the steps of, supplying a sequence of instructions and data to the PEs, executing the instructions on the PEs, enabling and disabling writing of data to registers in each PE in dependence on a multi-bit data value stored in an EMC register on each PE, and modifying the multi-bit value in the EMC register of each PE when the writing of data to registers on that PE is disabled and the writing of data to registers in other PEs is enabled.

BRIEF DESCRIPTION OF THE DRAWINGS

Preferred embodiments of the invention will now be described in detail by way of example with reference to the accompanying diagrams in which.

DETAILED DESCRIPTION

Two specific embodiments of the invention will be described here. The first is the more straightforward to describe and so better illustrates the behaviour of the invention. The second embodiment details an improved method of encoding some of the values used which result in a reduction of the hardware implementation cost.

Figure 1:
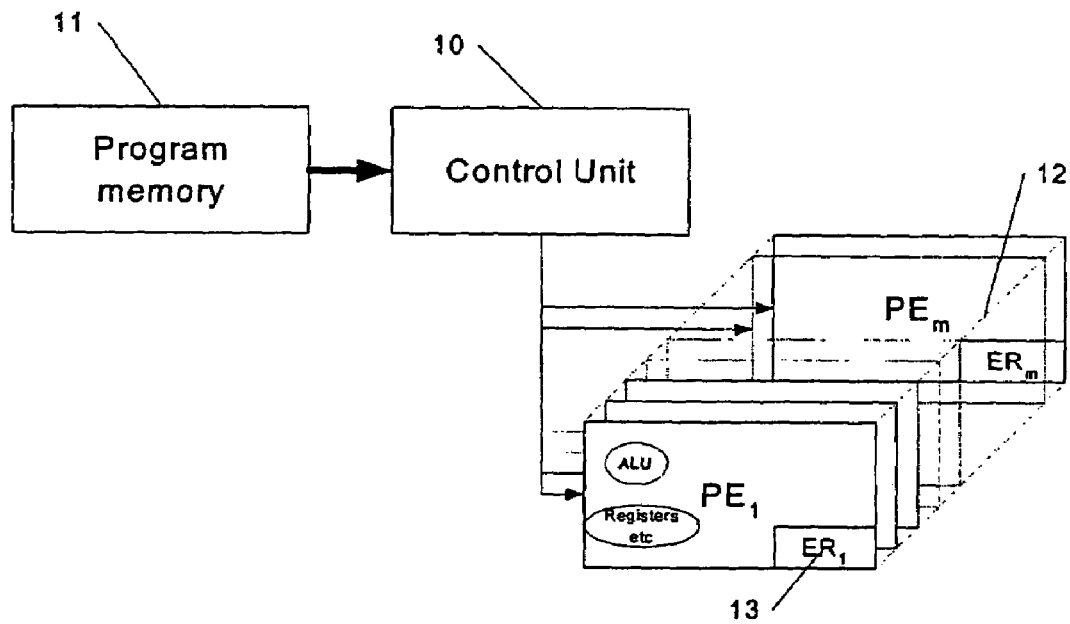
FIG. 1 shows a typical arrangement of a SIMD device.
Figure 2:
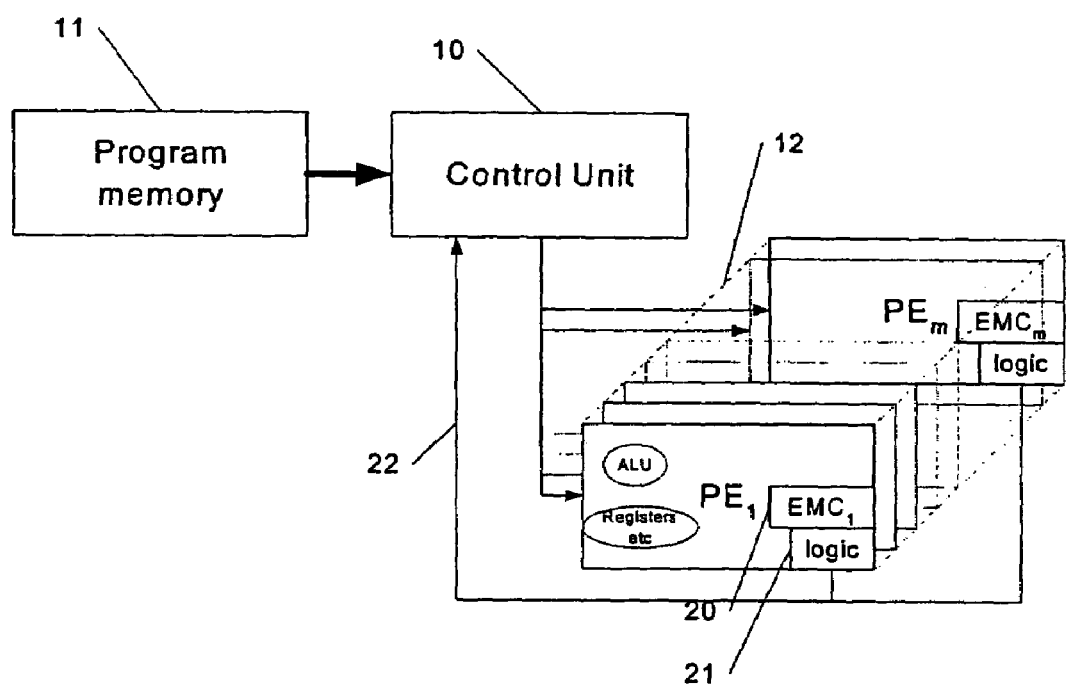
FIG. 2 shows a very broad overview of the new invention.

With reference to FIG. 2, in the first embodiment the ER flag of the prior art in each PE is replaced with a multi-bit "Execute Mask Count" register or EMC 20. Each EMC has an associated test logic unit 21, which can report when the EMC is one of several predefined values—these pre-defined tests are for example 'EMC is zero', 'EMC=1', and 'EMC=2'. Other values are possible. A set of signals per PE 22, including the results of the associated pre-defined EMC tests, is fed to the CU. The purpose of these signals will be described in detail later.

The EMC is used to disable/enable the writing-back of instruction results to internal PE registers: when the value is 'zero', the writing-back is enabled and is disabled for all non-zero values. Note that, unlike the prior art, this is a test of all the bits in the EMC register.

At the start of a program or process, all EMCs are initialised to predetermined values. These values are usually chosen to be zeros thus initially enabling all PEs.

Instructions

In the preferred embodiments, five additional control instructions are defined to support structured control flow. These instructions are . . .

| | |
|---|---|
| CondStart, | Conditional Start |
| CondElseIf, | Conditional ELSE IF |
| CondSetMask, | Conditional SET MASK |
| CondLoopTest, and | Conditional LOOP TEST |
| CondEnd. | Conditional END |

Note, however, that variations of these instructions (e.g. additional or modifications to) will be apparent to one skilled in the art.

Each control instruction has two or three 'immediate data' fields that are used to parameterise that instruction's behaviour, which will shortly be described using a pseudo-code format. It should be noted that this is done for clarity and may not be the most efficient for direct hardware implementation. A more hardware friendly implementation will be described later but other alternatives will be apparent to one skilled in the art. Examples on how to utilise these to implement control flow then follow these descriptions.

1) CondStart (condition, MaskAdjustAmount, JumpTarget)

The CondStart instruction will be used to start most control flow blocks, and takes three fields. The first, 'condition', refers to some Boolean test that can be performed by the PE's ALU. For simplicity of description in the embodiment, this will just be a test of 'condition codes' (e.g. 'is negative', 'not zero', or 'True') as commonly seen in CPU instruction sets, but those skilled in the art will be able to envision other possibilities.

The second field, MaskAdjustAmount, describes how to adjust the local EMC value. In the preferred embodiments, this needs only be a choice of two possible values, '1' or '2'. The final field, JumpTarget, is used to alter the CU's program counter when certain conditions are met.

Briefly, for each PE, if the condition test fails or the EMC is non-zero, then the EMC is adjusted/incremented by the MaskAdjustAmount. If all EMCs are non-zero, the CU jumps to the instruction indicated by JumpTarget.

The behaviour of the instruction is summarised concisely by the following pseudo-code:

```
CondStart( condition, MaskAdjustAmount, JumpTarget)
BEGIN
    /*
    // PE Processing
    */
    FOR P in ALL_PEs DO
        IF ((P.condition !=TRUE) OR
(P.ExecuteMaskCount != 0)) THEN
            P.ExecuteMaskCount+=
MaskAdjustAmount;
        ENDIF
    ENDFOR
    /*
    // Branch processing.
    */
    IF All_PEs (ExecuteMaskCount != 0) THEN
        jump JumpTarget
    ENDIF
END
```

Figure 3:
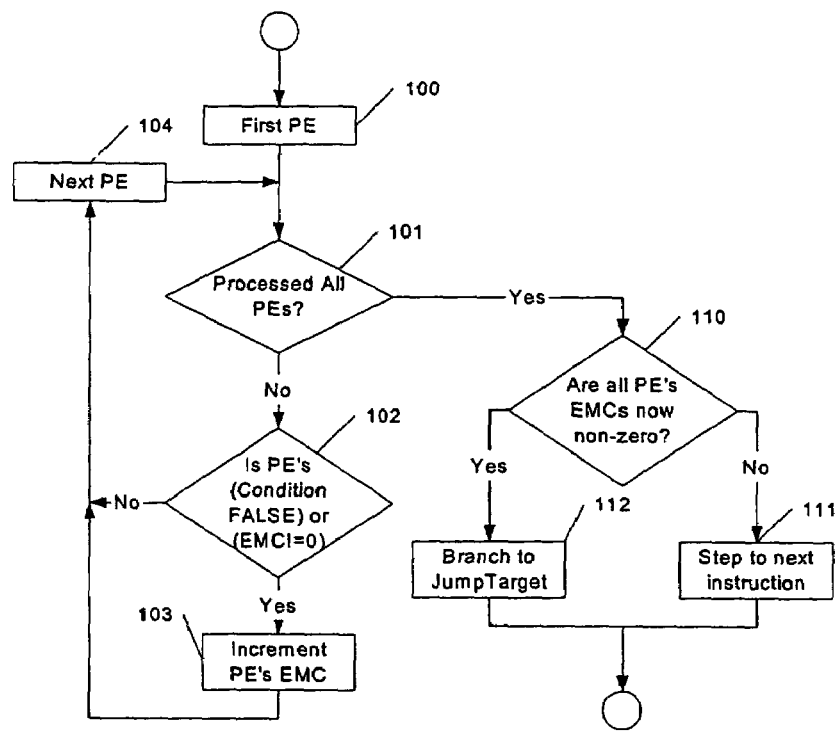
FIG. 3 is a flowchart of a preferred embodiment's Cond-Start instruction.

The behaviour is also given diagrammatically in FIG. 3. In step 100, the instruction begins by examining the 'first' PE. Step 101 checks if we have examined all PEs and will proceed to step 102. Here it tests the condition requested in the instruction against the state of the PE and also examines the EMC value. If the condition evaluates to FALSE or the EMC value is nonzero, then the processing proceeds to step 103, whereupon the EMC is incremented by the 'mask adjust amount' as specified in the instruction. It then goes to step 104. If at step 102 the test takes the 'NO' path, then it also proceeds to step 104.

At step 104 instruction advances to the next PE (if any) and back to step 101. When all PEs have been processed by 102 and 103, it proceeds to step 110. If there are some PEs that still have a zero EMC value, the Program counter is advanced, in the standard fashion, to the next instruction 111. Otherwise, if all PEs are currently disabled, i.e. all EMCs≠0, then the instruction branches to the 'Jump target', in step 112.

2) CondElseIf (condition, MaskAdjustAmount, JumpTarget)

The CondElseIf instruction is primarily used for else/elseif clauses as well as for implementing continueloop and breakloop statemements. It takes the same three parameters as CondStart. The functionality is . . .

```
CondElseIf( condition, MaskAdjustAmount, JumpTarget)
BEGIN
    /*
    // PE Processing
    */
    FOR P in ALL_PEs DO
        IF (P.ExecuteMaskCount == 0) THEN
            P.ExecuteMaskCount :=
MaskAdjustAmount;
        ELSIF (P.condition AND
(P.ExecuteMaskCount == 1))
            P.ExecuteMaskCount = 0;
        ENDIF
    ENDFOR
    /*
    // Branch processing.
    */
    IF All_PEs (ExecuteMaskCount != 0) THEN
        jump JumpTarget
    ENDIF
END
```

Figure 4:
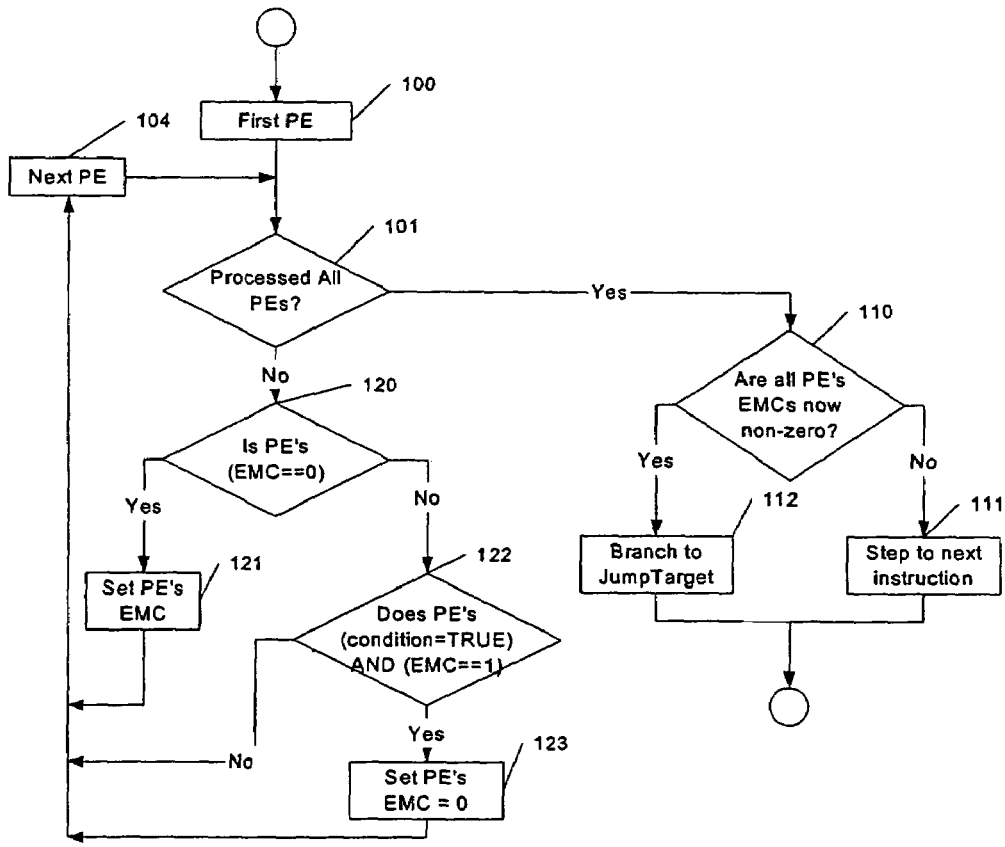
FIG. 4 is a flowchart of a preferred embodiment's CondElsif instruction.

This functionality is also shown in FIG. 4. Steps 100, 101, 104, 110, 111, and 112 are identical to those as described previously. In step 120, which replaces step 103, the EMC is tested for equality to zero and, if so, the EMC is set to the instruction's 'MaskAdjustAmount' 121, and control proceeds to step 104. If the EMC is non-zero in step 120, then in step 122 the EMC is tested for equality to 1, and the condition is tested. If either of these tests fail, control again proceeds to step 104. If both pass, in step 123, the EMC value is set to zero, and control once more proceeds to step 104.

3) CondSetMask (condition, MaskAdjustAmount, JumpTarget)

This instruction can be used for breakloops/continueloops, early returns, and exits. The instruction behaves as follows . . .

```
CondSetMask( condition, MaskAdjustAmount, JumpTarget)
BEGIN
    /*
    // PE Processing
    */
    FOR P in ALL_PEs DO
        IF ( (P.condition==TRUE) AND
(P.ExecuteMaskCount == 0) ) THEN
            P.ExecuteMaskCount =
MaskAdjustAmount;
        ENDIF
    ENDFOR
    /*
    // Branch processing.
    */
    IF All_PEs (ExecuteMaskCount != 0) THEN
        jump JumpTarget
    ENDIF
END
```

Figure 5:
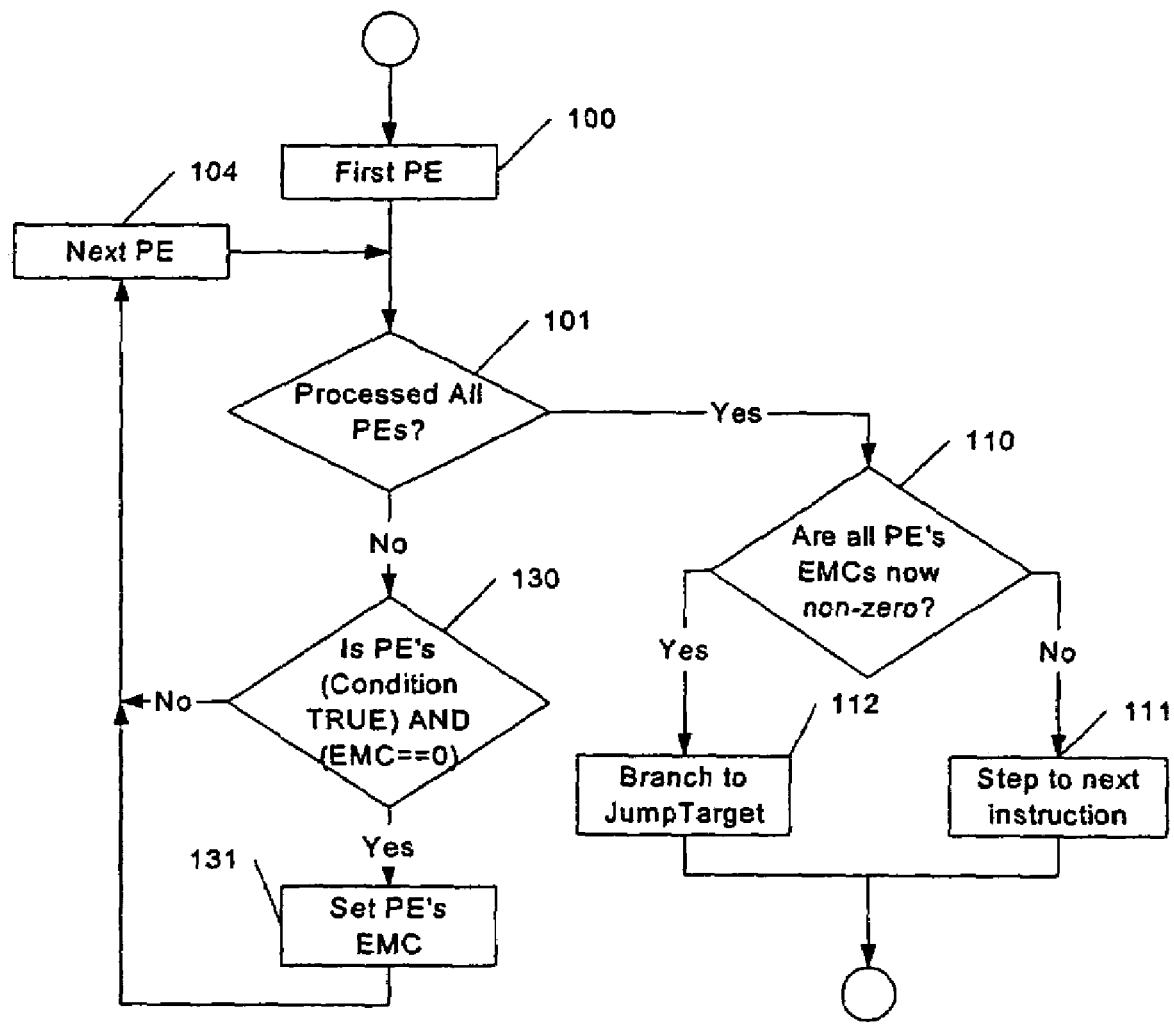
FIG. 5 is a flowchart of a preferred embodiment's Cond-SetMask instruction.

This behaviour is also summarised in FIG. 5. This is almost identical in behaviour to CondStart (i.e. FIG. 3) except that steps 102 and 103 been replaced by steps 130 and 131, respectively. In step 130, the EMC is tested for equality to zero, and if this is the case and the condition is true, then it proceeds to step 131, whereupon the EMC is set to the MaskAdjustAmount specified in the instruction. If the test in 130 fails, the control passes to step 104 as before.

4) CondLoopTest (condition, MaskAdjustAmount, JumpTarget)

This is used at the end of a loop structure for both pre- and post-tested loops. In the preferred embodiments, the MaskAdjustAmount is again restricted to values of 1 or 2.

```
CondLoopTest(condition, MaskAdjustAmount, JumpTarget)
BEGIN
    BOOL ExitLoop = TRUE;
    /*
    // PE Processing - determine if any PEs are
    active
    */
    FOR P in ALL__PEs DO
        IF ( (P.Condition == TRUE) AND
(P.ExecuteMaskCount == 0) ) THEN
            ExitLoop = FALSE;
        ENDIF
    ENDFOR
    /* If we should exit the loop */
    IF (ExitLoop) THEN
        FOR P in ALL__PEs DO
            IF (P.ExecuteMaskCount >
MaskAdjustAmount) THEN
                P.ExecuteMaskCount -=
MaskAdjustAmount;
            ELSE
                P.ExecuteMaskCount = 0;
            ENDIF
        ENDFOR
    /*else if we should continue iterating */
    ELSE
        FOR P in ALL__PEs DO
            IF (P.Condition == FALSE) AND
(P.ExecuteMaskCount == 0) THEN
                P.ExecuteMaskCount =
MaskAdjustAmount;
            ENDIF
        ENDFOR
        jump JumpTarget;
    ENDIF
END
```

Once again, the form of the above description is intended for clarity. For efficiency, a hardware implementation may use a different arrangement.

Figure 6:
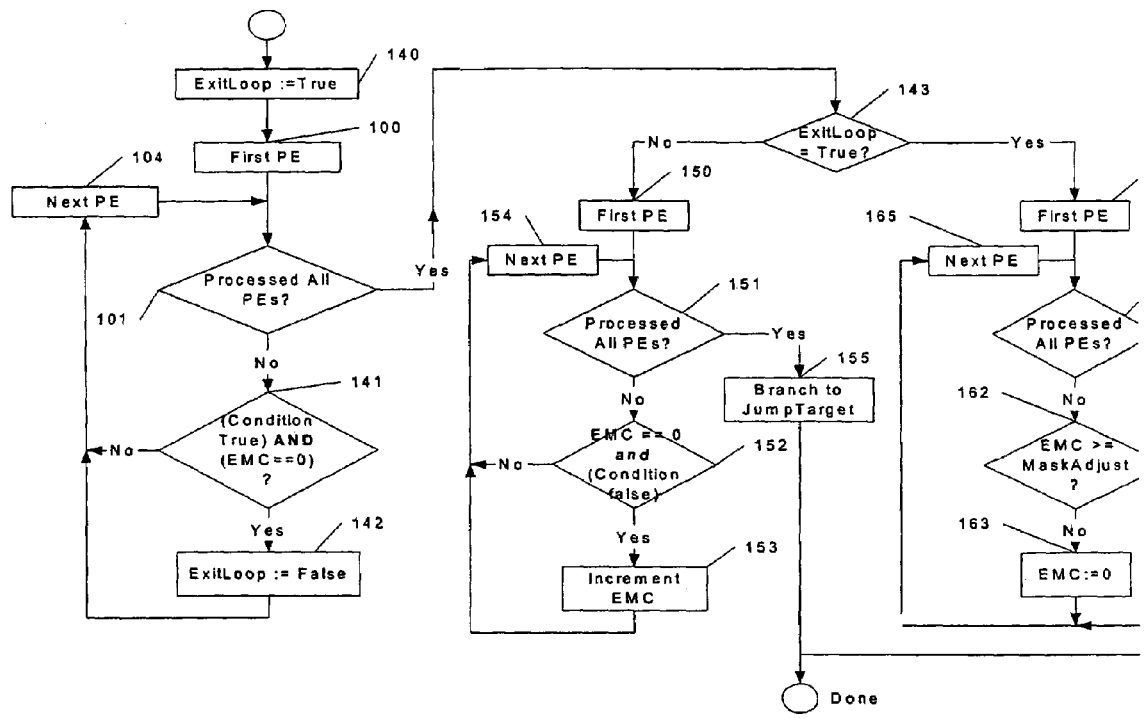
FIG. 6 is a flowchart of a preferred embodiment's Cond-LoopTest instruction.

This behaviour is shown in FIG. 6. The first step 140 is to set the Boolean Flag, 'ExitLoop' to True, and then proceeds to step 100. It should be noted that steps 100, 101, and 104 perform the same functions as described in the previous instructions. If still processing PEs after step 101, the method proceeds to step 141. If any PE indicates that it still needs to execute, i.e., Condition is True and the EMC is zero, then proceeds to step 142, or otherwise proceeds to 104. In step 142, the ExitLoop Boolean value is set to False.

Once step 101 determines that all PEs have been tested, control proceeds to step 143 which examines the ExitLoop flag—if False, control proceeds to step 150, or otherwise it proceeds to step 160. Step 150 starts another iteration pass through the PEs followed by step 151 detecting when the iteration has completed. When processing a particular PE, step 152 determines if that PE has just terminated its loop, i.e. EMC=0 and Condition is False. If this is not the case, control passes to step 154, or otherwise to step 153. In step 153, the MaskAdjustAmount is added to the EMC value, and control proceeds to step 154 which moves on to the next PE, and subsequently to step 151. If step 151 indicates that the all PEs have been processed, step 155 sets the CU program counter to be the "Jump Target".

When step 160 is chosen, it also starts a different iteration pass through the PEs with step 161 determining when all PEs have been processed. In step 162, a PE's EMC value is examined and if this is less than (or equal to) the MaskAdjustAmount, the EMC is set to zero 163, or otherwise the value is subtracted from the EMC 164. Control then continues to step 165 which progresses to the next PE. When step 161 determines all PEs have been processed, step 166 advances the CU program counter to the next instruction.

5) CondEnd (MaskAdjustAmount, JumpTarget)

The final instruction is used at the end of a control flow instruction. It behaves as follows:

```
CondEnd(MaskAdjustAmount, JumpTarget)
BEGIN
    /*
    // PE Processing
    */
    FOR P in ALL__PEs DO
        IF ( (P.ExecuteMaskCount >
MaskAdjustAmount) ) THEN
            P.ExecuteMaskCount -=
MaskAdjustAmount;
        ELSE
            P.ExecuteMaskCount = 0;
        ENDIF
    ENDFOR
    /*
    // Branch processing.
    */
    IF All__PEs (ExecuteMaskCount != 0) THEN
        jump JumpTarget
    ENDIF
END
```

Figure 7:
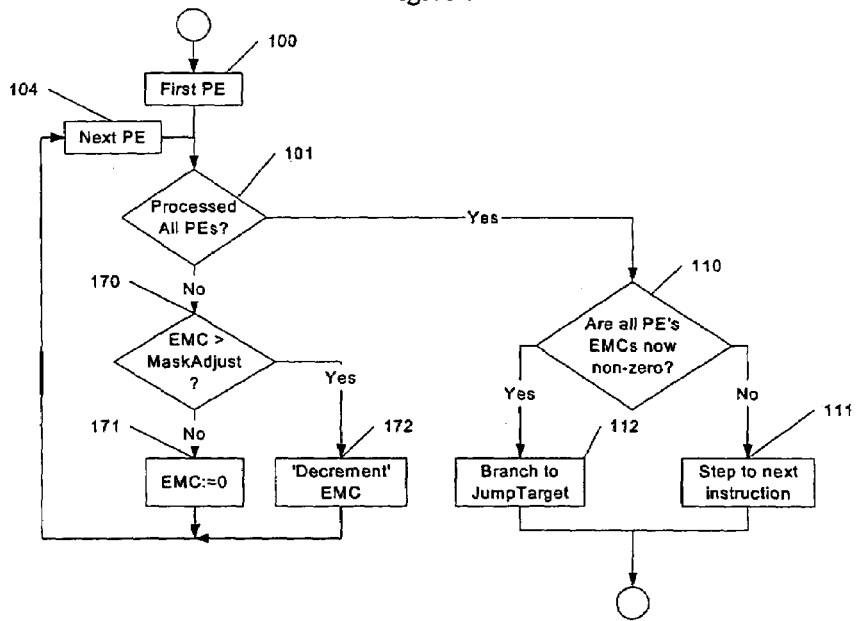
FIG. 7 is a flowchart of a preferred embodiment's Cond-End instruction.

This behaviour is also shown in FIG. 7. The behaviour is very similar to that of condstart (FIG. 3) with steps 100, 101, 104, 110, 111, and 112 being identical, but steps 102 and 103 are replaced with 170, 171, and 172 as follows: In step 170 if the EMC value is less than or equal to the MaskAdjustAmount, the EMC is simply set to zero, step 171, or otherwise the MaskAdjustAmount is subtracted from the EMC, step 172.

In the preferred embodiments, the MaskAdjustAmount is again restricted to values of 1 or 2.

Translating Control Flow Constructs

The instructions described above are used to implement the control-flow constructs previously described. A few examples will be presented which, although far from exhaustive, should be sufficient to teach these skills in compilers with the simple principles involved.

Example: 'IF' constructs:

A simple if/else statement . . .

```
IF (condition__1) THEN
    CodeBlock__1;
ELSE
    CodeBlock__2;
ENDIF
```

. . . could be translated as . . .

```
CondStart(condition__1, 1 , ELSE__ADDR);
CodeBlock__1;
```

-continued

```
    ELSE_ADDR:
        CondElseIf(TRUE, 1, ENDIF_ADDR);
        CodeBlock_2;
    ENDIF_ADDR:
        CondEnd(1, next_CondEnd_etc);
```

This behaves as follows: Condstart is executed upon entry to the 'IF'. Whenever a PE is enabled (EMC=0) and 'condition_1' is 'true', 'CodeBlock_1' will be executed. For all other PEs, the EMC is incremented by MaskAdjustAmount, i.e. '+1'. If there are no active PEs, then the CU branches immediately to ELSE_ADDR, thus skipping all the instructions in 'CodeBlock_1'.

At ELSE_ADDR, the CondElseIf will set any enabled PEs to 'disabled', and enable any PE that only failed 'condition_1' (i.e., those with EMC=1).

At the end of the 'IF', the original EMC values are restored by the CondEnd instruction.

An 'IF' with 'ELSIF' clauses is slightly more involved. For example, the following pseudo code . . .

```
IF (condition_1) THEN
    CodeBlock_1;
ELSIF (condition_2) THEN
    CodeBlock_2;
ELSIF (condition_3) THEN
    CodeBlock_3;
ELSE
    CodeBlock_4;
ENDIF
```

. . . would be translated as follows

```
;
;Reserve 2 values for operating the ELSEIFs
;
    CondStart(TRUE, 2 , somewhere_after_endif);
;
;Perform the first test
;
    CondSetMask (NOT condition_1, 1, TEST2_ADDR);
    CodeBlock_1;
TEST2_ADDR:
    CondElseIf(condition_2, 2, TEST3_ADDR)
    CodeBlock_2;
TEST3_ADDR:
    CondElseIf(condition_3, 2, ELSE_ADDR)
    CodeBlock_3;
ELSE_ADDR:
    CondElseIf(TRUE, 2, ENDIF_ADDR)
    CodeBlock_4;
ENDIF_ADDR:
    CondEnd(2, next_CondEnd_etc);
```

With this code, once any PE that was enabled at the start of the conditional loop has executed a section of code, its EMC will be set to 2. Any that has not yet satisfied a test has an EMC of 1.

It is possible to create an alternative embodiment wherein a modified CondElseIf instruction has two 'branch addresses' so that it can perform even more 'short circuiting' of the conditional code.

Example: Loop constructs:

A simple 'while' statement . . .

```
WHILE (condition_1) DO
    CodeBlock_1;
ENDWHILE
```

. . . could be translated as . . .

```
    CondStart(condition_1, 1 , ENDWHILE_ADDR);
LOOPSTART_ADDR:
    CodeBlock_1;
ENDWHILE_ADDR:
    CondLoopTest(condition_1, 1, LOOPSTART_ADDR);
```

To support loops with 'breakloop' and 'continueloop' functionality, e.g . . .

```
WHILE (condition_1) DO
    CodeBlock_1;
    IF (condition_2) THEN
        CodeBlock_2;
        CONTINUELOOP;
    ENDIF;
    CodeBlock_3;
    IF (condition_3) THEN
        CodeBlock_4;
        BREAKLOOP;
    ENDIF;
    CodeBlock_5;
ENDWHILE
```

. . . the initial 'MaskAdjustAmount' is instead set to '2' allowing for both 'continueloop' and 'breakloop' states to be monitored. For example:

```
    CondStart(condition_1, 2 , ENDWHILE_ADDR);
LOOPSTART_ADDR:
    CodeBlock_1;
    ;
    ; IF (condition_2) THEN ...
    ;
    CondStart(condition_2, 1, ENDIF_1_ADDR);
        CodeBlock_2;
        /*Continueloop: set EMC to IF Masking + 1,
i.e. 2*/
        CondSetMask (TRUE, 2, ENDIF_1_ADDR);
ENDIF_1_ADDR:
    CondEnd(1, CONTINUE_ADDR);
    CodeBlock_3;
    ;
    ; IF (condition_3) THEN ...
    ;
    CondStart(condition_3, 1, ENDIF_2_ADDR);
        CodeBlock_4;
        /*Breakloop: set EMC to IF Masking + 2,
i.e. 3*/
        CondSetMask (TRUE, 3, ENDIF_2_ADDR);
ENDIF_2_ADDR:
    CondEnd(1, CONTINUE_ADDR);
    CodeBlock_5;
CONTINUE_ADDR:
    ;Re-enable any continueloops for next iteration
    CondElseIf(TRUE, 0, ENDWHILE_ADDR)
ENDWHILE_ADDR:
    CondLoopTest(condition_1, 1, LOOPSTART_ADDR);
```

If the breakloop or continueloop is the only code within an 'if', a single CondSetMask instruction will suffice for its implementation. It is also possible to implement enhanced 'breakloop/continueloop' commands that control, not just the innermost loop but also a parent loop by increasing the CondSetMask values.

Case statements are handled in a very similar manner to the ELSIF code while recursion, up to a maximum value determined by the size of the CU's program counter stack and the number of bits in the EMC, is automatically handled by the described approach.

Hardware Structure

Figure 8:
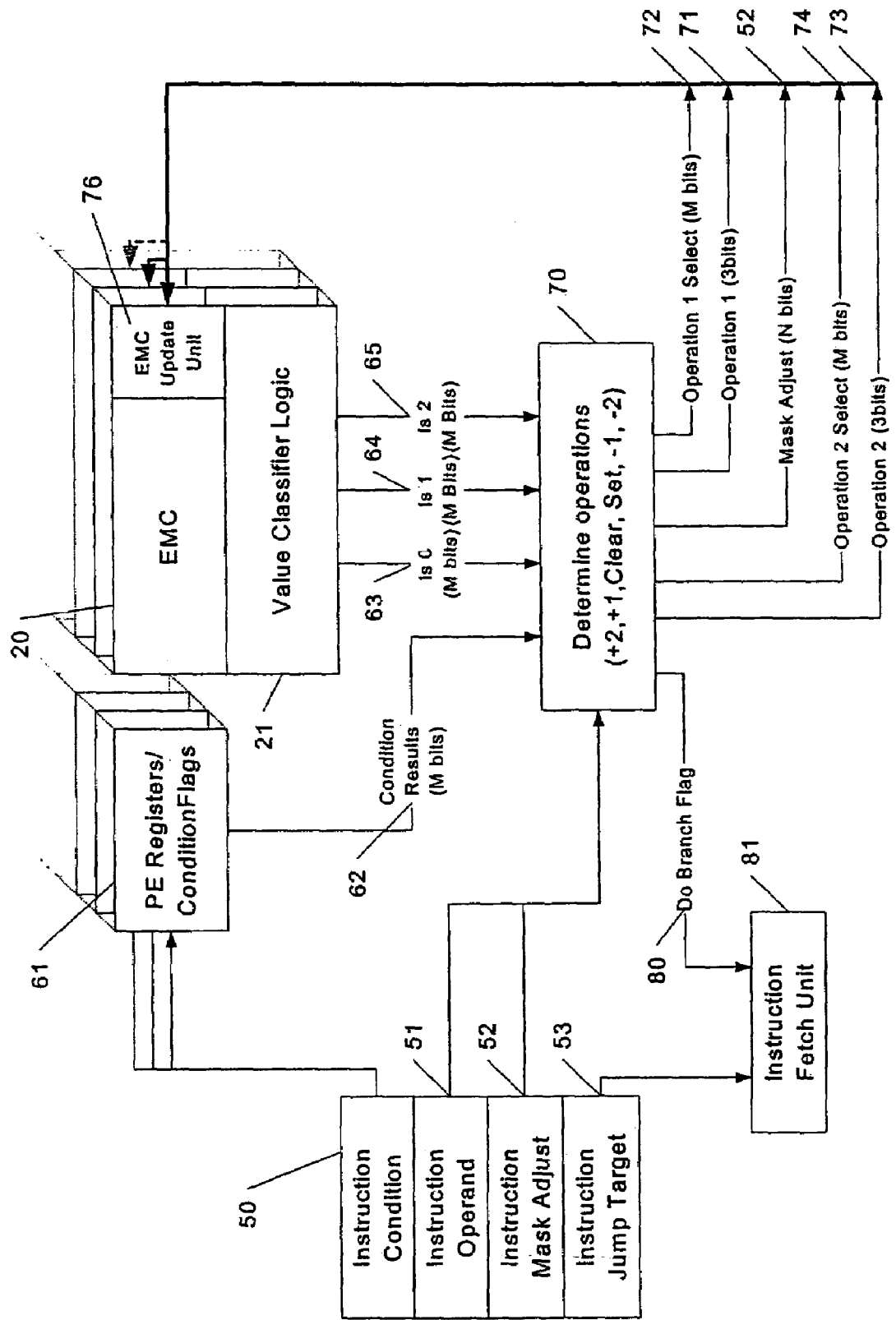
FIG. 8 shows an overview of the logic used to control the enabling/disabling of PEs in response to control flow instructions in an embodiment of the invention.

A preferred arrangement for the operation of the instructions will now be described with reference to FIG. 8. When the CU processes one of the above control flow instructions, the instruction 'condition' 50, Operand 51, MaskAdjustAmount 52, and Jump Target 53, fields are extracted.

The 'condition' 50, is broadcast to all M PE units and tested against specific registers or condition flags 61. For each PE, a Boolean flag is generated by the tests producing M resulting bits 62. As described previously, the EMC value 20 for each PE is tested to determine if it matches one of three predetermined values, i.e., 0, 1, or 2, generating three Boolean flags. Each flag is grouped with the matching values from the other M PEs to create three sets of M bits 63, 64, and 65, corresponding to 'Is 0', 'Is 1', and 'Is 2'. Clearly, a particular bit position, corresponding to one of the M PEs, can only be 'true' in at most one of the M bits 63, 64, or 65.

The 'determine operations' unit 70 takes the Condition Results 62, the three sets of EMC value flags 63, 64, or 65, and the Instruction Operand 51, and Instruction Mask 52, and determines how to adjust all the PE EMC values to respond to the instruction. There are six possible operations that can be chosen (ignoring a trivial No-Operation option) These operations are:

Add 2 to an EMC
Add 1 to an EMC
Clear an EMC to 0
Set an EMC to the instruction's Mask Adjust Amount 52,
Subtract 1 from an EMC
Subtract 2 from an EMC These choices can clearly be encoded with three bits.

For any particular instruction, at most one of these operations needs be applied to a particular PE's EMC and, furthermore, across all the PEs at most only two different operations will be used. The first operation choice, "Operation 1" 71, is encoded with 3 bits and copied to all "EMC Update Units" 76. An M-bit mask, "Operation 1 Select" 72 indicates which subset of the M EMC Update Units should perform this operation. The EMC update units simply perform the requested operation.

Similarly, the second possible operation choice, "Operation 2" 73, is also broadcast to all EMC Update Units, along with another M-bit mask, "Operation 2 Select" 74, which indicates which of the units should perform the operation. Again, any particular EMC Update Unit will perform, at most, only one of the two operations.

In order to perform a "Set EMC to Mask Adjust Amount" command, the mask Adjust Amount 52 is also broadcast to all EMC Update Units.

The remaining required function of unit 70 is to determine how the CU should adjust the program counter. If it sets the "Do Branch Flag" 80, the CU's "Instruction Fetch Unit" 81, will update the program counter to begin fetching instructions from the instruction's "Jump Target" 53.

Details of the behaviour of the "Determine Operations" unit 70, are now summarised by the following pseudo code.

```
DecideOp( IN BIT ConditionResults[M],    // 62
                IN BIT Is0[M],
    // 63
                IN BIT Is1[M],
    // 64
                IN BIT Is2[M],
    // 65
                IN INT Instr_Operand,
    // 51
                IN INT Instr_MaskAdjust,  //
52
                OUT INT Oper_1,
        // 71
                OUT BIT Oper_1_Select[M], //
72
                OUT INT Oper_2,
    // 73
                OUT BIT Oper_2_Select[M], //
72
                OUT BIT DoBranch)
    // 80
BEGIN
    // Set of PEs active after instruction...
    BIT ActivePEs[M];
    //
    // Determine which PEs will be active
    //
    CASE (Instr_Operand)
        WHEN CondStart:
        WHEN CondLoopTest:
        BEGIN
            ActivePEs := Is0 BIT_AND
ConditionResults;
            DONE;
        END
        ////
        WHEN CondSetMask:
        BEGIN
            ActivePEs := Is0 BIT_AND
BIT_NOT(ConditionResults);
            DONE;
        END
        ////
        WHEN CondEnd:
        BEGIN
            IF(Instr_MaskAdjust == 1) THEN
                ActivePEs := Is0 BIT_OR Is1;
            ELSE
                ActivePEs := Is0 BIT_OR Is1
BIT_OR Is2;
            ENDIF
            DONE;
        END
        ////
        WHEN CondElseIf:
        BEGIN
            IF (MaskAdjustAmount == 0) THEN
                ActivePEs := Is0 BIT_OR (Is1
BIT_AND ConditionResults);
            ELSE
                ActivePEs := Is1 BIT_AND
ConditionResults;
            ENDIF
            DONE
        END
    ENDCASE
    //
    // Determine the "Do Branch Flag" ('80')
setting.
    // The decision is reversed for LoopTests
    //
    DoBranch := (ActivePEs == "00000..000");
    IF(Instr_Operand == CondLoopTest) THEN
        DoBranch := NOT DoBranch;
    ENDIF
    //
```

-continued

```
// Decide how to update the EMCs
//
CASE(Instr_Operand)
    WHEN CondStart:
    BEGIN
        Oper_1_Select := BIT_NOT ActivePEs;
        Oper_2_Select := "00000..000"
        IF(Instr_MaskAdjust == 1) THEN
            Oper_1 := EMC_ADD_1;
        ELSE
            Oper_1 := EMC_ADD_2;
        ENDIF
        DONE
    END
    /////
    WHEN CondElself:
    BEGIN
        Oper_1_Select   := Is0;
        Oper_1          := EMC_SET;
        Oper_2_Select   := Is1 BIT_AND ConditionResults;
        Oper_2          := EMC_CLEAR;
        DONE
    END
    /////
    WHEN CondSetMask:
    BEGIN
        Oper_1_Select   := Is0 BIT_AND ConditionResults;
        Oper_1          := EMC_SET;
        Oper_2_Select   := "00000..000";
        DONE
    END
    /////
    WHEN CondLoopTest:
        //IF still running the loop
        IF( DoBranch) THEN
            // Disable any additional PEs
            Oper_1_Select := IsZero AND (NOT ConditionResults);
            IF(Instr_MaskAdjust == 1) THEN
                Oper_1 := EMC_ADD_1;
            ELSE
                Oper_1 := EMC_ADD_2;
            ENDIF
            Oper_2_Select  := "00000..000";
        //// Else we are exiting the loop
        ELSE
            IF(Instr_MaskAdjust == 1) THEN
                Oper_1_Select := BIT_NOT Is0;
                Oper_1        := EMC_SUB_1;
                Oper_2_Select := "00000..000";
            ELSE
                // Set ones to zero
                Oper_1_Select := Is0 BIT_OR Is1;
                Oper_1        := EMC_CLEAR;
                //Sub 2 from all values >= 2
                Oper_2_Select := BIT_NOT (Is0 BIT_OR Is1);
                Oper_2        := EMC_SUB_2;
            ENDIF
        ENDIF
        DONE
    END
    WHEN CondEnd:
    BEGIN
        IF(Instr_MaskAdjust == 1) THEN
            Oper_1_Select := BIT_NOT Is0;
            Oper_1        := EMC_SUB_1;
            Oper_2_Select := "00000..000";
        ELSE
            // Set ones to zero
            Oper_1_Select := Is0 BIT_OR Is1;
            Oper_1        := EMC_CLEAR;
            //Sub 2 from all values >= 2
            Oper_2_Select := BIT_NOT (Is0 BIT_OR Is1);
            Oper_2        := EMC_SUB_2;
        ENDIF
        DONE
    END
ENDCASE
END
```

Figure 9:
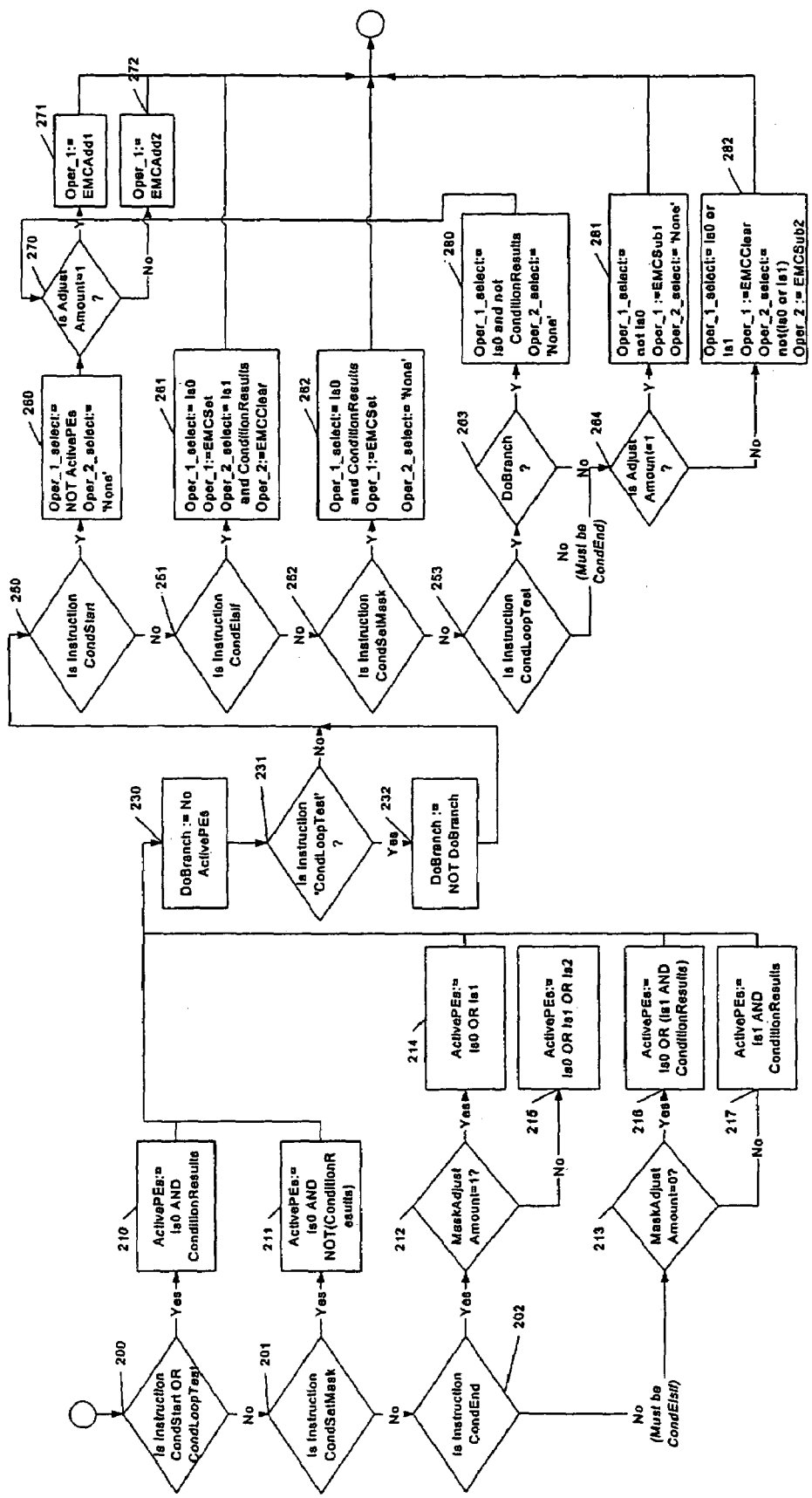
FIG. 9 is a flowchart of a subset of the logic of FIG. 8.

The above functionality is also illustrated in FIG. 9. At step 200, the current instruction type is tested. If it is either a CondStart or CondLoopTest, then it proceeds to step 210, or otherwise to step 201. In step 201, if it is a CondSetMask instruction, control proceeds to step 211, or otherwise to step 202. If in step 202 the instruction is a CondEnd, the control proceeds to step 212, or otherwise the instruction must be a CondElsif and control proceeds to step 213.

In step 210, the set of M Boolean Flags, "ActivePEs", is set to the bitwise AND of the Is0 flags with the ConditionResults.

In step 211, ActivePEs is set to the be the bitwise AND of the Is0 flags with the Negation of the ConditionResults.

In step 212, the Instruction's MaskAdjustAmount is tested. If set to 1, control proceeds to step 214 (it must be 2), or otherwise control proceeds to step 215. In step 214, ActivePEs is set to Is0 or'ed with Is1, while in step 215, ActivePEs is set to Is0 Is1 or Is2.

In step 213, the Instruction's MaskAdjustAmount is tested. If set to 0, control passes to step 216, or otherwise to step 217. In step 216, ActivePEs is set Is0 or'ed with "Is1 and'ed with ConditionResults", while in step 217, ActivePEs is set to Is1 and'ed with ConditionResults.

After steps 210, 211, 214, 215, 216, or 217, control passes to step 230, wherein the Boolean Flag "DoBranch" is set to true if ActivePEs is the zero vector, or otherwise it is set to False.

In steps 231 and 232, the instruction type is again tested and, if was a CondLoopTest, the DoBranch signal is inverted. Control passes to step 250.

In step 250, if the instruction is CondStart, control proceeds to step 260, or otherwise to step 251 where if the instruction is a CondElsif, control proceeds to step 261, or otherwise to step 252 where if the instruction is a CondSetMask, control proceeds to step 262, or otherwise to step 253. In step 253, if the instruction is a CondLoopTest, control proceeds to step 263, or otherwise to step 264.

In step 260, Oper_1 is enabled for all nonactive PEs and Oper_2 is disabled, and control passes to step 270, which tests the instruction's MaskAdjustAmount. If this is 1, control passes to step 271, where "EMC Add 1" is chosen as Oper_1, or otherwise control passes to step 272 where "EMC Add 2" is chosen for Oper_1.

In step 261, Oper_1 is set to "EMCSet" and is enabled for all PEs with EMC=0. Oper_2 is set to "EMC Clear" and is enabled for all PE's with EMC=1 and Condition which is true.

In step 262, Oper_1 is set to "EMCSet" and is enabled for all PEs with EMC=0 and Condition=True. Oper_2 is disabled.

Step 263 determines if the loop is to continue operation or is to be exited, by examining the DoBranch flag. If DoBranch is True, control proceeds to step 280, or otherwise to step 264 which also handles the CondEnd code. In step 280, Oper_1 is enabled for all PEs with EMC=0 and whose condition is FALSE, and Oper_2 is disabled. Control passes to step 270.

In step 264, the MaskAdjustAmount is tested—if the value is 1, control passes to step 281, or otherwise to step 282. In 281, Oper_1 is set to "EMC Sub 1" and enabled for all PE's with Non-Zero EMCs, and Oper_2 is disabled.

In step 282, Oper_1 is set to "EMC Clear" and enabled for all PEs with an EMC of either 0 or 1, and Oper_2 is set to "EMC Sub 2" for all other PEs.

Second Embodiment

In a second preferred embodiment, a saving in hardware cost can be achieved by appreciating that the EMC values do not have to be represented as integers but can use an alternative mathematical group. In particular, this embodiment uses a field based on primitive polynomials modulo 2. These are frequently used for Linear Feedback Shift Registers, or LFSRs.

In this system, the basic values/operations are substituted as follows:

| 1st Embodiment's Value or Operation | Replacement in 2nd Embodiment |
|---|---|
| Value of 0 | Value of 1 |
| Add 1 | Multiply by 2 mod polynomial |
| Add 2 | Multiply by 4 mod polynomial |
| Subtract 2 | Multiply by ¼ mod polynomial |
| Subtract 1 | Multiply by ½ mod polynomial |

For a given size of EMC, i.e. M bits, the primitive polynomial is chosen so that it has the minimum possible number of terms. In this embodiment, M is 9, and the chosen primitive polynomial is $x^9+x^5+1$. To implement the replacement for "Add 1" the following pseudo code, which is trivial to translate into a hardware description language such as VHDL, is used:

```
BIT[9] FuncAdd1(BIT In[9])
BEGIN
    BIT[9] Out;
    Out[8 downto 1] := In[7 downto 0];
    Out[0]          := In[8] XOR In[4];
    Return Out;
END
```

The "Sub 1" is replacement is similar:

```
BIT[9] FuncSub1(BIT In[9])
BEGIN
    BIT[9] Out;
    Out[7 downto 0] := In[8 downto 1];
    Out[8]          := In[5] XOR In[0];
    Return Out;
END
```

These functions are used twice to evaluate the "Add 2" and "Sub 2" equivalents.

Those skilled in the art will appreciate that these operations are considerably cheaper to implement in hardware and also have the advantage of constant time to evaluate. This compares very favourably with normal integer addition and subtraction which could take linear effort. The extremely minor disadvantage of this system is that only ($2^M-1$) unique values can be represented (as opposed to $2^M$ with integers) but, given the substantial savings in addition/subtraction hardware, M can easily be increased.

In alternative embodiments, different sizes of the EMC, with corresponding primitive polynomials, may be used.

The invention claimed is:

1. A single instruction multiple data processing device (SIMD) comprising:
    a plurality of processing elements (PE), each PE including an execute mask count (EMC) register for storing a plurality of bits and an associated test logic unit for testing for one of several predefined test values stored in the EMC;
    means for enabling and disabling writing of data to registers in the PE in dependence on more than one of the predefined test values; and
    a control unit (CU) for receiving a set of signals for each PE including the results of the associated predefined EMC tests.

2. The SIMD according to claim 1, wherein the PE is disabled and enabled in dependence on a comparison of the data stored in the EMC register with a predetermined value.

3. The SIMD according to claim 1, wherein the means for enabling and disabling operates during execution of conditional or loop instructions.

4. The SIMD according to claim 1 further comprising means for modifying the data stored in the EMC register of each PE.

5. The SIMD according to claim 4, wherein the means for modifying the data stored in the EMC register comprises means for performing a selected one of a plurality of modifications on the data.

6. The SIMD according to claim 4, wherein the means for modifying the data stored in the EMC register includes means for incrementing the data value by a predetermined amount.

7. The SIMD according to claim 4, wherein the means for modifying the data stored in the EMC register includes means for decrementing the data value by a predetermined amount.

8. The SIMD according to claim 4, wherein the means for modifying the data stored in the EMC register includes means for multiplying the data value by a predetermined amount.

9. The SIMD according to claim 4, wherein the means for modifying the data stored in the EMC register includes means for dividing the data value by a predetermined amount.

10. The SIMD according to claim 1, wherein the data values in the EMC register use a field based on primitive polynomials.

11. A method for controlling program flow on a single instruction multiple data processing device (SIMD) comprising a plurality of processing elements (PE), each PE including a multi-bit execute mask count (EMC) register and an associated test logic unit for testing for one of several predefined test values stored in the EMC, the method comprising the steps of:
    supplying to each PE, instructions to be executed, the instructions including conditional instruction to be executed by the PE;
    enabling or disabling writing of data to registers in the PE in dependence on more than one of the predefined test values and a condition test preformed in a conditional instruction under execution; and sending a set of signals for each PE including the results of the associated predefined EMC tests to a control unit (CU).

12. The method according to claim 11 further comprising the step of modifying the data stored in the EMC register of each PE.

13. The method according to claim 12 further comprising the step of selecting between a plurality of possible modifications to the data stored in the EMC register.

14. The method according to claim 11 further comprising the steps of determining whether the writing of data to registers in a plurality of PEs is enabled or disabled, and branching to a new instruction in dependence on the result of the determination.

15. The method according to claim 12, wherein the modifying step comprises incrementing the data stored in the EMC register by a predetermined amount.

16. The method according to claim 12, wherein the modifying step comprises decrementing the data stored in the EMC register by a predetermined amount.

17. The method according to claim 12, wherein the modifying step comprises multiplying the data stored in the EMC register by a predetermined amount.

18. The method according to claim 12, wherein the modifying step comprises dividing the data stored in the EMC register by a predetermined amount.

19. The method according to claim 12, wherein the data value in the EMC register uses a field based on a primitive polynomials.

20. A method for controlling program flow on a single instruction multiple data processing device (SIMD) comprising a plurality of processing elements (PE), each PE including an associated test logic unit for reporting one of several values from predefined tests stored in the EMC, the method comprising the steps of:

supplying a sequence of instructions and data to the PEs;

executing the instructions on the PEs;

enabling or disabling writing of data to registers in each PE in dependence on more than one of the predefined test values stored in an execute mask count (EMC) register on each PE;

modifying the test values in the EMC register of each PE when the writing of data to registers on that PE is disabled and the writing of data to registers in other PEs is enabled; and sending a set of signals for each PE including the results of the associated predefined EMC tests to a control unit (CU).

21. The method according to claim 20 further comprising the steps of testing whether the writing of data to registers in all of the PEs is enabled or disabled, and branching to another instruction in dependence on the result of the determination.

22. A single instruction multiple data processing device (SIMD) comprising:

a plurality of processing elements (PE), each PE including an execute mask count (EMC) register and an associated test logic unit for reporting values from predefined tests stored in the EMC;

means for supplying a sequence of instructions and data to the PEs for execution;

means for enabling and disabling writing of data to registers in each PE in dependence on more than one of the predefined test values;

means for modifying the test values in the EMC register of each PE when the writing of data to registers in that PE is disabled and the writing of data to registers in other PEs is enabled; and a control unit (CU) for receiving a set of signals for each PE including the results of the associated predefined EMC tests.

23. The SIMD according to claim 22 further comprising means for testing whether the writing of data to registers in all of the PEs is enabled or disabled, and means for branching to another instruction in dependence on the result of the determination.

* * * * *